(12) United States Patent
Chen et al.

(10) Patent No.: US 6,619,994 B1
(45) Date of Patent: Sep. 16, 2003

(54) JACK PLUG OF DIGITAL CONNECTOR

(75) Inventors: Zen-Chyuan Chen, Junghe (TW); Kuo-Chiang Wu, Junghe (TW)

(73) Assignee: Jess-Link Products Co., Ltd., Taipei Hsien (TW)

( * ) Notice: Subject to any disclaimer, the term of this patent is extended or adjusted under 35 U.S.C. 154(b) by 0 days.

(21) Appl. No.: 10/322,741

(22) Filed: Dec. 19, 2002

(51) Int. Cl.[7] ................................................ H01R 24/04
(52) U.S. Cl. ......................... 439/669; 385/54; 385/55; 385/59; 385/76; 385/88; 385/92; 385/101
(58) Field of Search ........................... 439/669; 385/54, 385/55, 59, 76, 77, 89, 88, 92, 100, 101

(56) References Cited

U.S. PATENT DOCUMENTS

| | | | |
|---|---|---|---|
| 4,705,485 A | * | 11/1987 | Hansen ........................ 439/669 |
| 5,527,190 A | * | 6/1996 | Weingartner ................. 439/669 |
| 5,542,015 A | * | 7/1996 | Hultermans ................... 385/60 |
| 6,278,831 B1 | * | 8/2001 | Henderson et al. ......... 385/139 |

* cited by examiner

*Primary Examiner*—Dean A. Reichard
*Assistant Examiner*—Anton Harris
(74) *Attorney, Agent, or Firm*—Rabin & Berdo, P.C.

(57) ABSTRACT

A jack plug of digital connector includes a jack plug with an optical fiber cable. The device is characterized in that the jack plug is composed of a front plug and a tail plug. A plug hole is disposed at the back part of the front plug. The tail plug has an insertion hole and on the front part of the tail plug possesses two clips at upper and bottom side respectively. The optical fiber cable picks through the insertion hole of the tail plug and then insert the tail plug into the plug hole of the front plug so as to make the two clips of the tail plug hold the optical fiber cable and fixed them at the back end of the front plug.

1 Claim, 5 Drawing Sheets

JACK PLUG OF DIGITAL CONNECTOR

BACKGROUND OF THE INVENTION

Field of the Invention

The invention relates generally to a jack plug of a digital connector, especially to a jack plug having a front plug and a tail plug, arranged on one end of an optical fiber cable. Thus, the optical fiber cable could pick through the tail plug, then insert the tail plug into the front plug which makes the tail plug holds the optical fiber cable and fixed it at the back of the front plug.

In convention, the computer needs to design a connector for audio and video signal transmitting on its mother board or by using interface card when use multimedia peripherals.

Traditionally, signal is usually transmitted by a coaxial cable which is apt to be interfered by outer signal. The drawback drives the development of transmitting signal by light wave with optical fiber cable. Owning to the excellent performance of signal transmitting by light wave, the technique is popular accepted by the manufacturing process of stereo and computer peripherals.

The structure of conventional jack plug of connector normally fixed one or two iron plate on the optical fiber cable, then fastened the jack plug with the optical fiber cable terminal by molding into plastic shape which is complicated in manufacturing and cost consuming. Thus reduces the ability of market competition and needs further improvement.

SUMMARY OF THE INVENTION

It is therefore a primary object of the present invention to provide a provide a device of a jack plug composed by a front plug and a tail plug with optical fiber cable being picked through the tail plug, then inserts into the back of front plug so as to let the tail plug hold the optical fiber cable tightly and fixed it on the back of the front plug.

The invention is composed of a front plug and a tail plug. A plug hole with clasping holes at upper and bottom sides opposite to each other is disposed at the back part of the front plug. The tail plug has an insertion hole and on the front part of the tail plug possesses two clips at upper and bottom sides thereof respectively. On the outer side of both clips fixed with tenons corresponding to the clasping holes of the front plug, so that the optical fiber cable could pick through the insertion hole of tail plug, then insert the tail plug into the plug hole of front plug which makes the tenons of the two clips of the tail plug clip into the clasping holes of the front plug so as to let the two clips of tail plug hold the optical fiber cable and fixed it at the back of the front plug.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
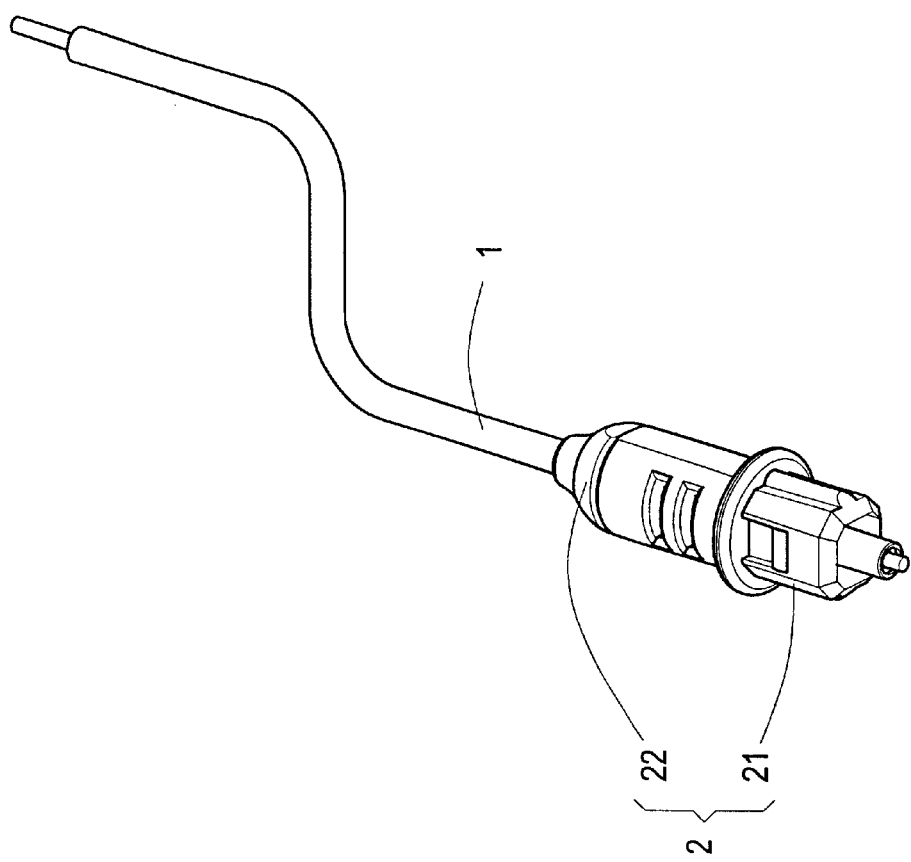
FIG. 1 is a perspective view of the present invention.
Figure 2:
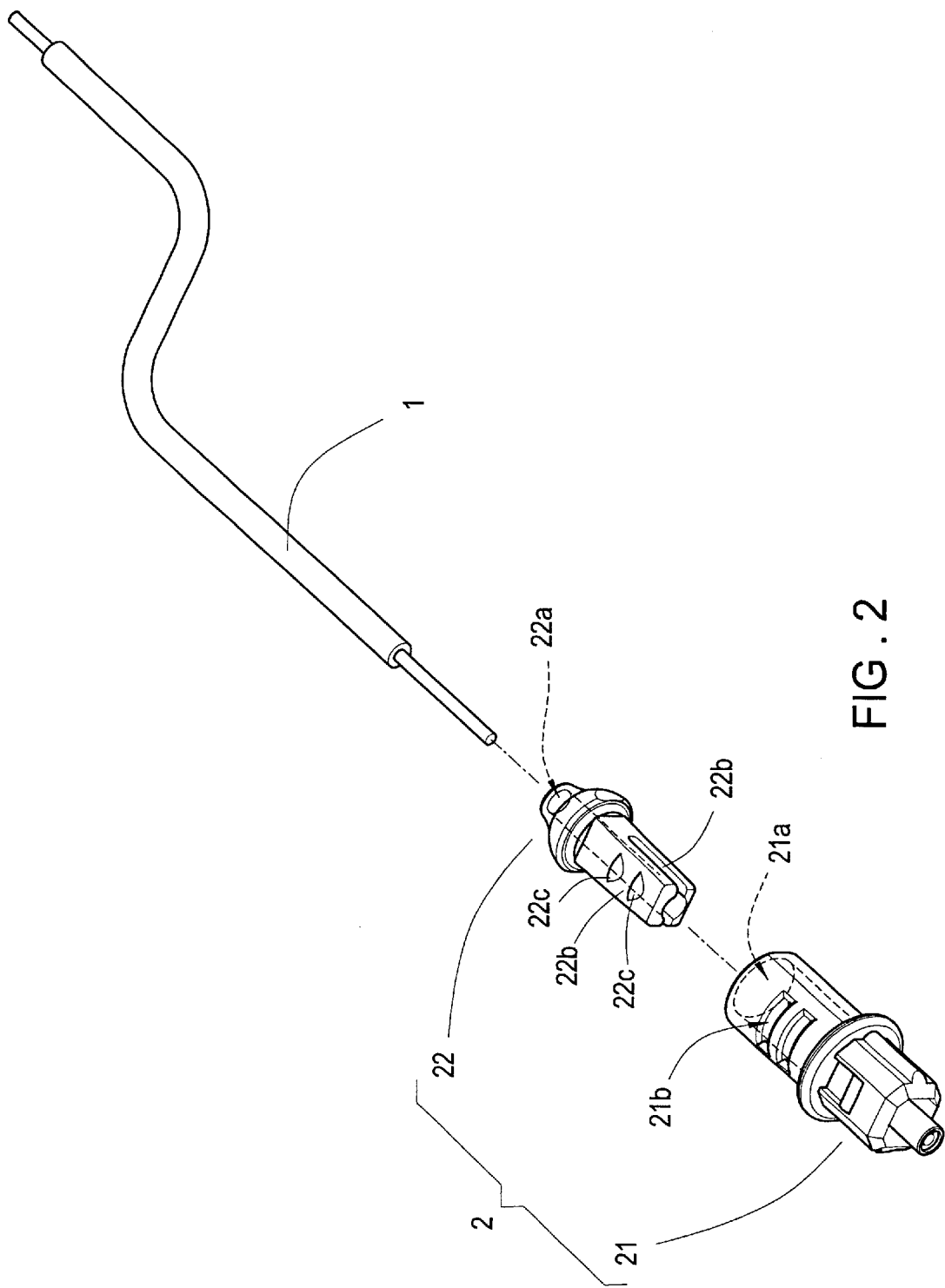
FIG. 2 is an exploded view of the present invention.
Figure 3:
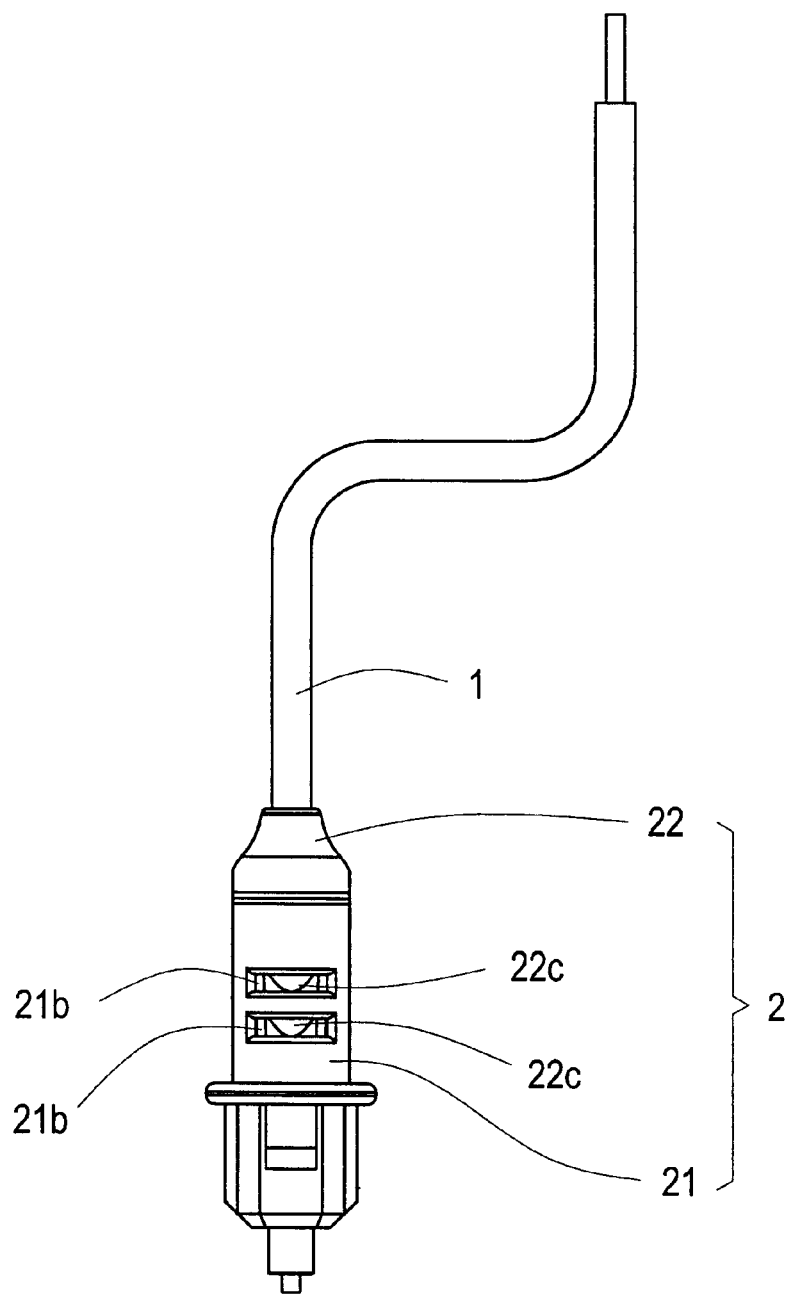
FIG. 3 is a side view of the present invention when being assembled.

Please refer to FIG. 1 and FIG. 2. The invention is composed of a jack plug 2 with an optical fiber cable 1. The jack plug 2 includes a front plug 21 and a tail a plug 22. The back part of the front plug 21 has a plug hole 21a that is defined by a sidewall of the housing, with clasping holes (i.e. recesses) 21b at upper and bottom sides of the front plug, and opposite to each other. The tail plug 22 has an insertion hole 22a. The front part of the tail plug 22 has two clips 22b at upper and bottom sides thereof, respectively. On the outer side of both clips 22b are tenons (projections) 22c which correspond to the clasping holes 21b of the front plug 21. The optical fiber cable 1 is inserted through the insertion hole 22a of the tail plug 22. Then, the tail plug 22 is inserted into the plug hole 21a of the front plug 21 until the tenons 22c of the two clips 22b of the tail plug 22 clip onto the clasping holes 21b of the front plug 21, as per FIG. 3, so as to cause the two clips of the tail plug 22 to hold the optical fiber cable 1 and fixed them at the back end of the front plug 21.

According to the structure of the above mentioned device, the optical fiber cable 1 is inserted through the insertion hole 22a of the tail plug 22 first by exposing a section of the optical fiber cable, then the end of the optical fiber cable 1 with the tail plug 22 is inserted into the plug hole 21a at the back end of the front plug 2, causing the tenons 22c of the two clips 22b of the tail plug 22 to engage the clasping holes 21b of the front plug 21, once the tail plug 22 is plugged into the hole 21a of the front plug. Then, the two clips 22b of the tail plug 22 will hold the optical fiber cable 1 tightly, and the tenons 22c of the outer side of two clips 22b of the tail plug 22 will engage the clasping holes 21b on lateral sides of the plug hole 21b of front plug 21. The tail plug 22 will thus be is fixed at the back of jack plug 2 which is fixed at the end of the optical fiber cable 1.

The jack plug 2 is separated into the front plug 21 and the tail plug 22. The optical fiber cable 1 is inserted through the insertion hole 22a of the tail plug 22, then inserted into the plug hole 21a of the front plug 21, and the two clips 22b of the tail plug 22 will thus hold the optical fiber cable 1 tightly, therefore avoiding the complicated procedures of traditional manufacturing, reducing the manufacturing cost and enhancing the market competition.

Figure 4:
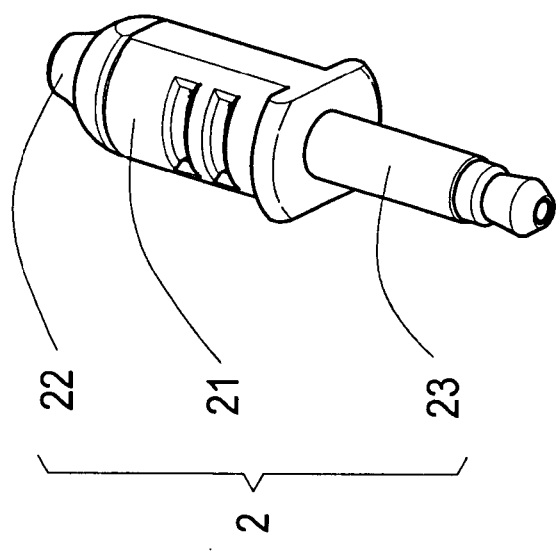
FIG. 4 is a perspective view of another embodiment of the present invention.
Figure 5:
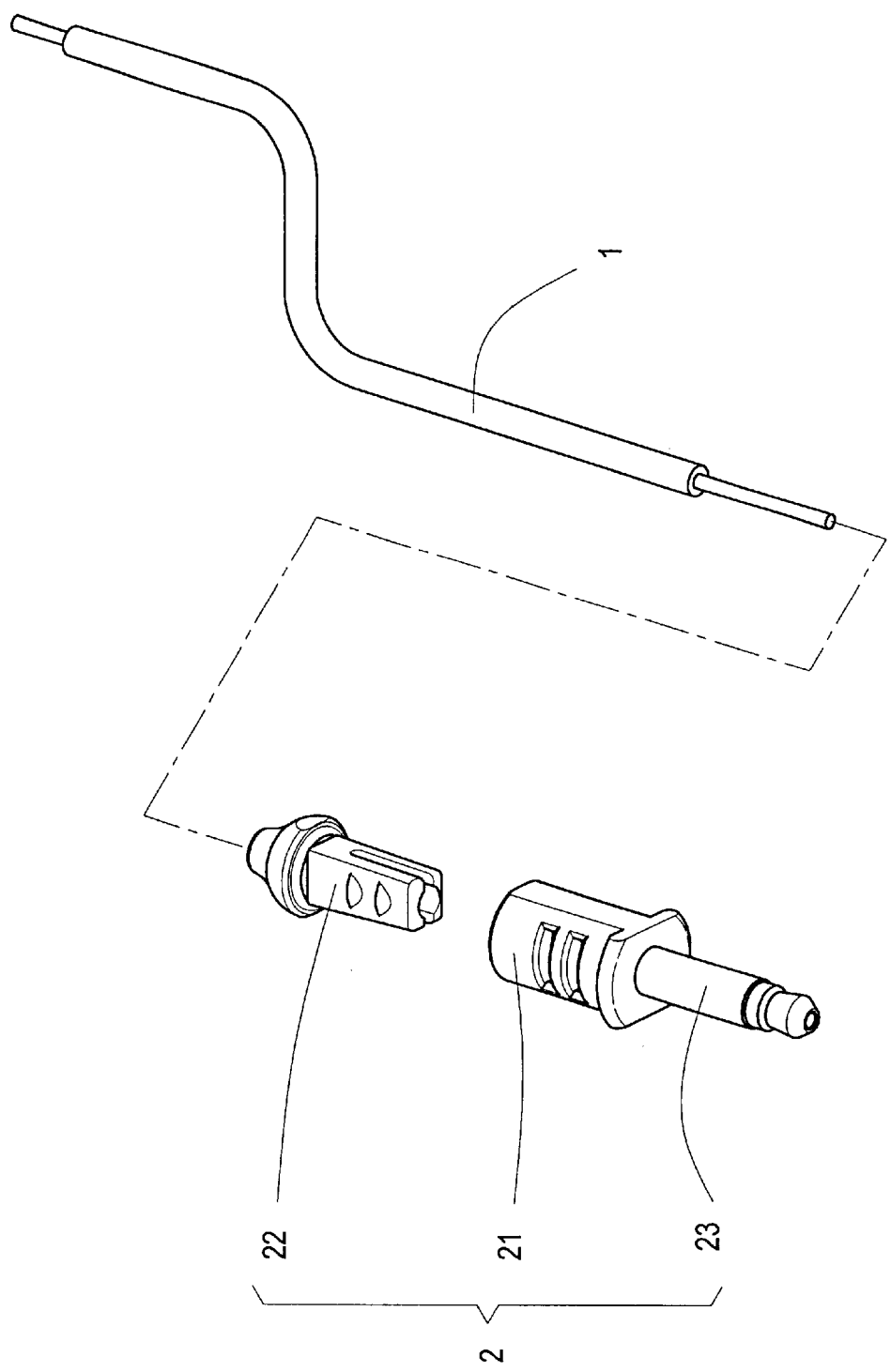
FIG. 5 is an exploded view of another embodiment of the present invention.

In the embodiment of FIG. 4 and FIG. 5, the front plug 21 of the jack plug 2 could be altered into a stick type 23 at its front end, and the optical fiber cable 1 is inserted through the insertion hole 22a of the tail plug 22, then inserted into the plug hole 21a of the front plug 21, and the two clips 22b of the tail plug 22 will thus hold the optical fiber cable 1 tightly. This is another embodiment of the present invention.

It should be noted that the above description and accompanying drawings are only used to illustrate some embodiments of the present invention, not intended to limit the scope thereof. Any modification of the embodiments should fall within the scope of the present invention.

What is claimed is:

1. A jack plug for an optical fiber cable, comprising:

a front plug having a plug hole at a rear end thereof, and having a plurality of clasping recesses formed in a side wall that surrounds the plug hole, with respective ones of the clasping recesses being disposed on opposite sides of the plug hole, and with each clasping recess being in communication with the plug hole; and a tail plug adapted to be received within the plug hole of said front plug, said tail plug having an insertion hole adapted to receive the optical fiber cable therein, and having an upper and a lower clip at a front part thereof, each clip having at least one projection thereon that corresponds in placement to a respective clasping recess of said front plug, whereby when the optical fiber cable is received within said tail plug, the optical fiber cable extends between said upper and said lower clips, and when said upper and lower clips are fully inserted into the plug hole of said front plug, each respective projection engages a respective recess to hold said tail plug to said front plug, and thereby causing said upper and lower clips to engage the optical fiber cable to hold the optical fiber cable in place.

* * * * *